United States Patent [19]

Tazartes et al.

[11] Patent Number: 5,422,817
[45] Date of Patent: Jun. 6, 1995

[54] STRAPDOWN INERTIAL NAVIGATION SYSTEM USING HIGH ORDER

[75] Inventors: Daniel A. Tazartes, West Hills; John G. Mark, Pasadena, both of Calif.

[73] Assignee: Litton Systems, Inc., Woodland Hills, Calif.

[21] Appl. No.: 744,178

[22] Filed: Aug. 13, 1991

[51] Int. Cl.⁶ .............................................. G01C 25/00
[52] U.S. Cl. ............................ 364/571.01; 364/566; 364/454; 364/571.03
[58] Field of Search ..................... 364/571.01, 571.03, 364/454, 566

[56] References Cited

U.S. PATENT DOCUMENTS

| | | | |
|---|---|---|---|
| 4,601,206 | 7/1986 | Watson | 73/514 |
| 4,675,820 | 6/1987 | Smith | 364/453 |
| 4,812,977 | 3/1989 | Hulsing | 364/422 |
| 5,146,417 | 9/1992 | Watson | 364/571.01 |

*Primary Examiner*—David C. Cain
*Attorney, Agent, or Firm*—James F. Kirk; Chester E. Martine, Jr.

[57] ABSTRACT

Sculling error correction means, using third or higher order correction to correct for sculling errors in apparatus for converting angle measuring and acceleration measuring signals from a vehicle set of coordinates into a stabilized set of navigation coordinates.

6 Claims, 5 Drawing Sheets

STRAPDOWN INERTIAL NAVIGATION SYSTEM USING HIGH ORDER

BACKGROUND OF THE INVENTION

Strapdown inertial navigation systems are frequently used in missiles and aircraft. Physically isolated and stabilized apparatus, such as a gimballed platform that is physically angularly stabilized relative to the local vertical direction, would require precise and mechanically complex angle positioning apparatus.

A state-of-the-art strapdown inertial navigation system has three angle sensors or gyros and three accelerometers rigidly attached to a supporting vehicle. The angle sensors are each positioned and oriented to sense angular displacement about one of three defined orthogonal axes attached to the vehicle body, and therefore known as, "body axes." The accelerometers are each positioned and oriented in a fixed direction relative to the vehicle, to sense velocity changes (incremental velocities) along different ones of the three defined orthogonal axes.

In a strapped down system the accelerometer axes are not angularly stabilized. Because the accelerometers are constantly changing direction relative to gravity, navigation velocities cannot be computed by directly integrating the accelerometer signals. Instead, a stable computational frame or analytic navigational coordinate system is continually generated. The output signals from the angle sensors are used by an attitude integration apparatus to calculate the directions of local vertical, together with two other axes orthogonal to the local vertical direction. Sensed angle changes and accelerations (incremental velocities) are continually rotated through the calculated angles from the vehicle body axes to the calculated navigation axes.

Angle signals from the angle sensors are used to update the computer-stored angular position and incremental velocity data for both the angle sensors and accelerometers relative to the stable analytic navigational coordinate system. The angle sensors and accelerometers have fixed relative directions in the body axes system An angular transformation matrix of directions cosines is computed in an attitude integration apparatus. The accelerometer signals, which are incremental changes in velocity, in the strapped down coordinate system are converted in a coordinate transformation computer from that system into corresponding signals in the stabilized navigational coordinate system. After transformation into the navigational coordinate system, the incremental velocity signals are integrated or summed to form updated velocity signals.

The angle sensor and accelerometer signals are sampled, and the sampled signals are delivered to a computer which is pre-programmed to accept the signals and to calculate both velocities along and angles about the three axes in the stabilized navigation coordinate system. The stabilized coordinate system is designated herein as the "navigation platform,." and its axes are designated the "navigation axes." An angle transformation matrix is created in the attitude integration apparatus to transform vector body-coordinate signals(for example, incremental velocity component signals) from the body axes of the instruments to the navigation axes. The transformed signals are used to calculate and create signals that are measures of the local geographical position of the aircraft and the direction of the local gravity. The transformation matrix also yields signals that are measures of the angular orientation of the supporting vehicle relative to the navigation axes.

The data used to compute the transformation matrix is sampled at finite periodic intervals, causing the bandwidth of the signals to be limited. When the instruments sense vibrations that occur at frequencies above or near the upper limit of the bandwidth of the transformation, where the response is poor, rectification errors occur in the calculated incremental velocity signals, and the navigation system signals are degraded. The rectification errors producing such degrading are called sculling errors.

A sculling error for a first strapped down axis is caused by a periodic angular displacement about a second axis perpendicular to that axis, multiplied by the periodic acceleration along a third axis perpendicular to the first and second axes.

To reduce the sculling error in strapdown systems, the sampling rate of the instrument signals may be increased. The upper limit of the sampling rate is set by the capabilities of the computer. An increase in sampling rate in a fast computer would likely increase the number of its calculations. The faster the computer, the greater its initial cost. The larger number of calculations might also require a prohibitively sophisticated computer with large power demand.

Instead of increasing the iteration rate for the transformation of incremental velocity from one coordinate system to the other, one might use a first order sculling error correcting algorithm which has the effect of emulating a faster transformation rate.

The "order" of the sculling error correcting algorithm refers to the number of sampling intervals used in each calculation of the algorithm.

One could use both a faster sampling and the first order correction to improve further the transformation of incremental velocity from the strapped down coordinates into the navigation coordinates.

BRIEF DESCRIPTION OF THE INVENTION

This invention contemplates using higher order correction terms. Specifically, third order correction is very useful.

Use of fifth and higher order correction terms are within the contemplation of the invention. So, too, is the combination of a faster sampling rate combined with the higher order sculling error compensation.

It is therefore an object of this invention to reduce sculling errors in incremental velocity signals converted from a strapped down set of instrument coordinates in a vehicle into a calculated stabilized navigation coordinate system.

Other objects will become apparent from the following description, taken together with the accompanying drawings.

DETAILED DESCRIPTION OF THE PREFERRED EMBODIMENT

Figure 1:
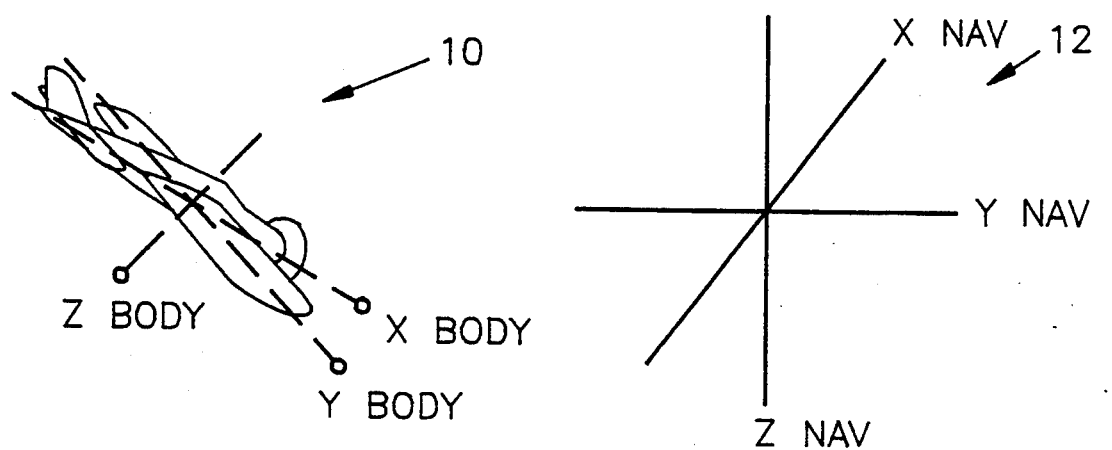
FIG. 1 shows a set of strapped down orthogonal axes and a set of calculated stabilized navigation axes.

FIG. 1 shows the angular relation between a vehicle XBODY, YBODY, ZBODY coordinate system (body coordinates) 10 and the calculated XNAV, YNAV, ZNAV navigation coordinate system 12. Both coordinate systems 10 and 12 are preferably orthogonal coordinate systems. The currently most useful coordinate systems are rectangular, but the invention is not limited to cartesian coordinate systems. Rectangular coordinate systems are shown. The ZNAV axis is usually locally vertical. It may, for example, be pointed toward or away from the earth's center. It may also, although not affected by gravity, be calculated to point in the direction of gravity. The XNAV and YNAV axes may be north-south, east west axes, but they could be pointed in some other known directions.

Figure 2A:
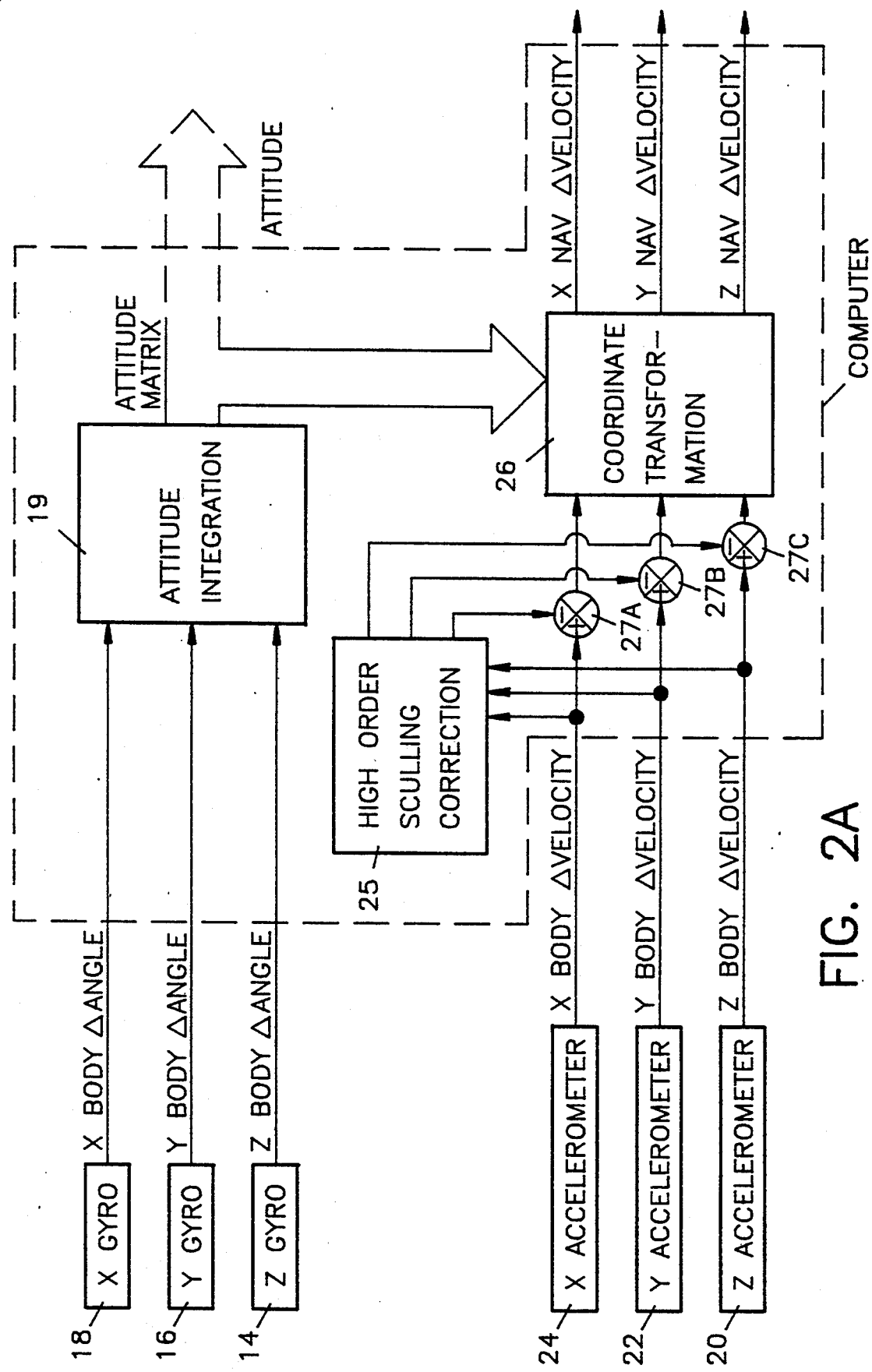
FIG. 2A is a block diagram of the flow of signals through a coordinate changing computer according to the invention wherein the sampling rates for the sculling correction and for the coordinate transformation are the same.

FIG. 2A is a block diagram of the conversion of incremental velocity measurement signals from the accelerometers 20, 22, 24 in the strapped down coordinate system 10 into the navigation coordinate system 12 wherein the sampling rate for the sculling correction and the coordinate transformation are the same.

The angle sensors 14, 16, 18 and accelerometers 20, 22, 24 are attached to a vehicle, such as an aircraft with their sensing axes nominally aligned with the XBODY,YBODY,ZBODY axes. The angle sensor incremental angle outputs are used in an attitude algorithm 19 which tracks the attitude of the strapdown body coordinates relative to the navigation coordinates via an attitude matrix.

A high order sculling correction 25 is computed according to the algorithms of this invention, using the accelerometer output signals.

When a high rate sampling is followed by a lower rate coordinate transformation, angle sensor signals, sampled at the same rate as the sampling of the accelerometers, may also be used to extend the sculling error correction.

For the situation wherein the sculling correction and coordinate transformation sampling rates are the same, the higher order sculling correction compensates the body incremental velocities signals in summers 27A, 27B, and 27C. A coordinate changing computer 26 periodically transforms the compensated incremental velocity signals from the coordinate system 10 into incremental velocity components in the coordinate system 12.

Figure 2B:
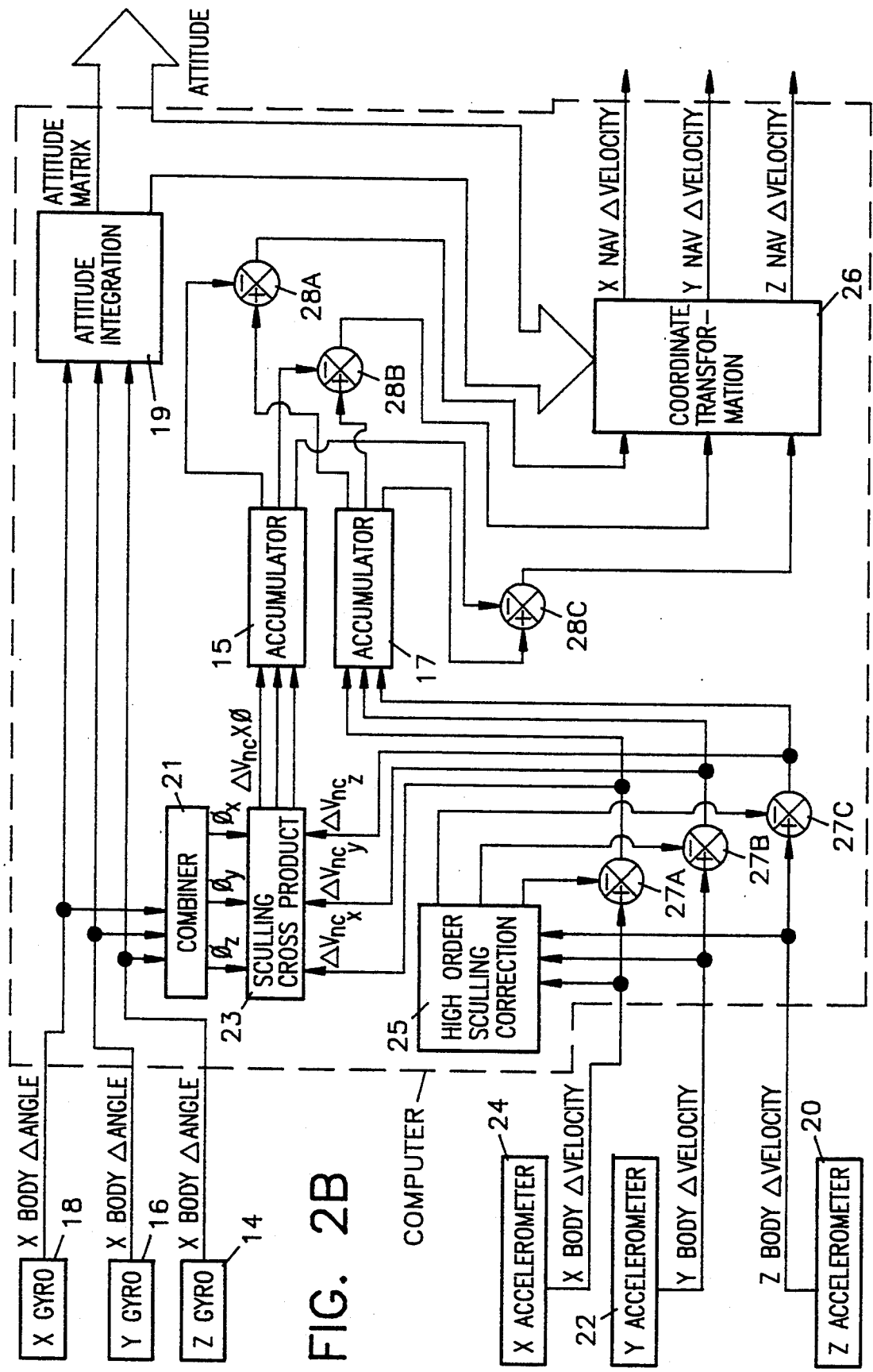
FIG. 2B is a block diagram of the flow of signals through a coordinate changing computer according to the invention wherein the sampling rates for the sculling correction and for the coordinate transformation are different.

FIG. 2B shows a signal flow for the situation wherein the sculling correction sampling rate is greater than the coordinate transformation rate. The corrected signal, $\Delta V_{nc}$ is cross-multiplied with a factor $\phi$ which is obtained from the change in body angle signals from the angular sensors or gyros 14, 16, 18. The signals are combined, as described below, in the combiner 21 and delivered to the sculling cross product apparatus 23.

The signals $\Delta V_{nc}$ are accumulated to the coordinate transformation frequency in an accumulator 17. The cross product signals are accumulated to the coordinate transformation frequency in an accumulator 15. The signal from accumulator 15 is subtracted in summers 28A, 28B, 28C, from the signal from accumulator 17. The coordinate transformation is then performed in the coordinate transformation apparatus 26 to produce a set of velocity signals in the navigational coordinate system.

Figure 4:
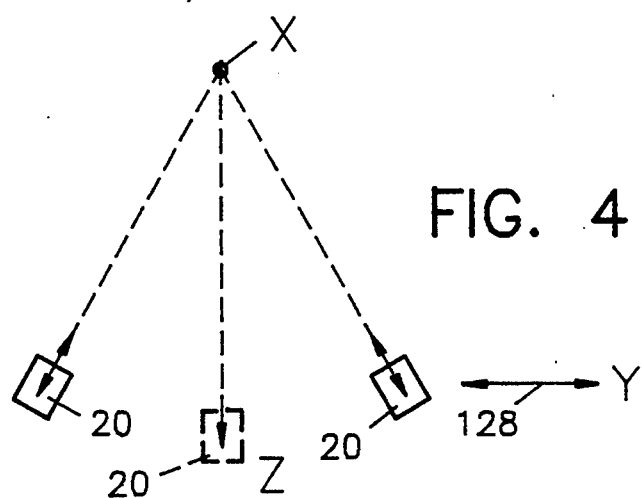
FIG. 4 is a schematic diagram useful to explain the meaning of "sculling errors."

FIG. 4 is a schematic diagram that is useful to describe sculling errors. Consider a vibrating velocity in the direction of the YNAV axis, as shown by the arrows 28, producing an angular vibration about, for example, an X axis. Although the velocity shown by the arrow 128 is oscillating in both directions along the YBODY axis, the ZBODY axis accelerometer 20 senses a unipolar oscillation, producing a signal having both a dc component and an ac oscillatory component. Such signals are produced because the sensing orientation of the ZBODY accelerometer changes synchronously with the vibration. While the acceleration sensed by the ZBODY axis accelerometer does contain a DC component, the DC amplitude is correct only in the rotating body coordinates. There is no resulting dc acceleration in the ZNAV direction. If a triad of orthogonal accelerometers were used and their acceleration outputs were continuously transformed through the rotation angle between the coordinate systems, the correct navigation acceleration componennts would be created.

However, in a strapdown system, the transformations between the two coordinate systems, using sampled data systems and a digital computer, occur at a finite iteration rate. The accelerometers measure the incremental velocity ($\Delta V$), which represents the average acceleration, over a sampling interval. Likewise, the angle sensor outputs, sampled at a finite rate, are used to update the angle transformation between the body axes and the navigation axes. Because the angle transformation occurs at a finite iteration rate, there is partial compensation for the sensed DC acceleration component (in the ZBODY direction for the case illustrated in FIG. 4). A residual DC error persists in the ZNAV direction in FIG. 4). The residual error is known as a sculling error. The size of the error depends on the frequency of the vibration and on the sampling frequency. At very low vibration frequencies, well below the sampling frequency, sculling motion does not cause any problems. At high frequencies approaching and greater than the sampling frequency, the sampled data does not accurately represent the actual motion.

To reduce the sculling errors, the prior art used a first order algorithm which reduced the errors as shown in the two examples represented by curves 50 and 52. For both of the curves 50 and 52, the sampling frequency for the coordinate transformation is 256 Hz. The curve 50 is an example wherein the sampling frequency for the accelerometer is 256 Hz. For the curve 52, the sampling frequency for the sculling correction is 512 Hz. Those sampling frequencies are shown by way of example only to compare the sculling error reduction for a first order sculling error correcting algorithm to the sculling error reduction for a third order sculling error correcting algorithm according to this invention.

Figure 3:
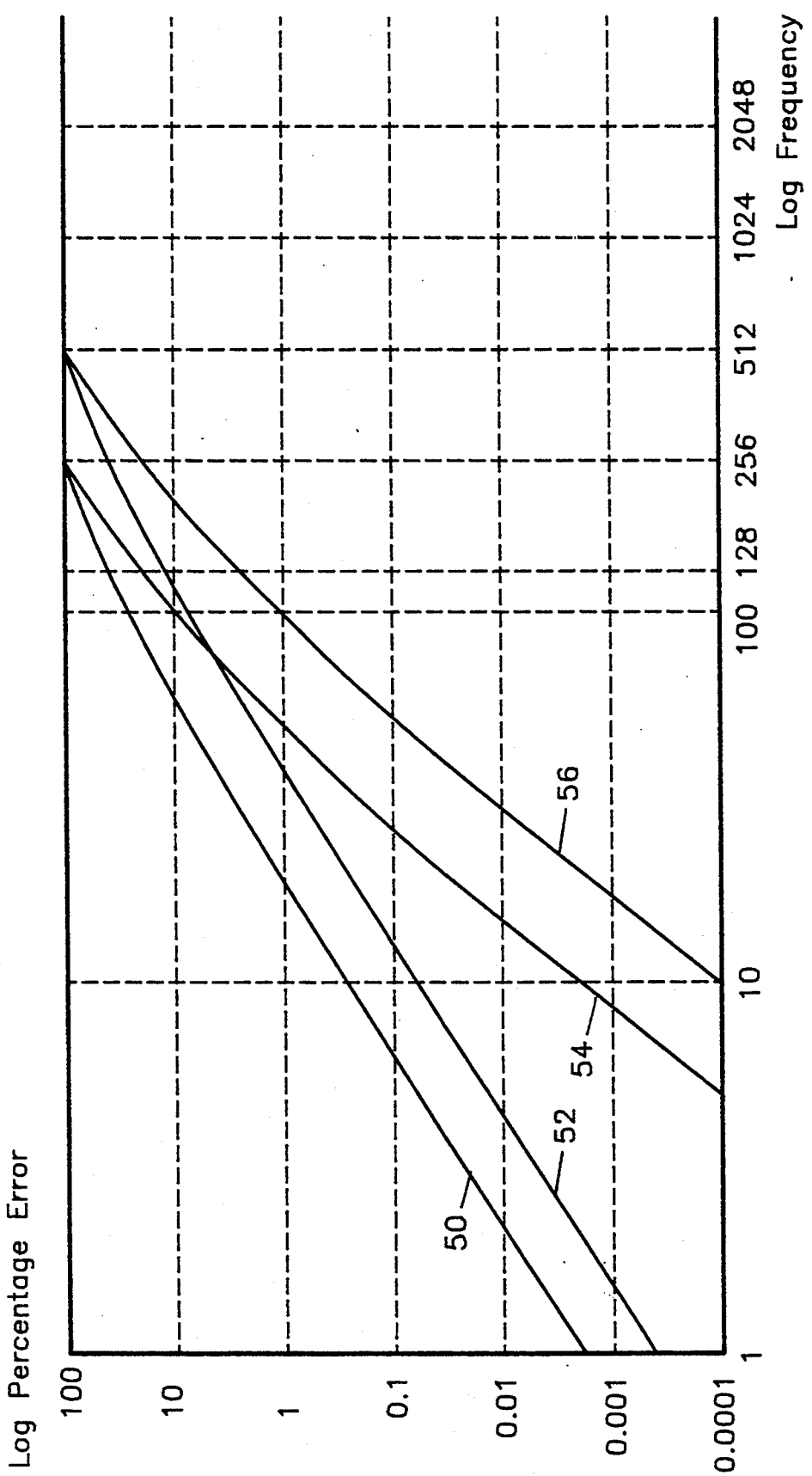
FIG. 3 is a graph, for two sampling rates, showing the percentage of sculling error for first and third order sculling correction, plotted against the frequency of the vibration causing the sculling errors.

In the curves of FIG. 3 a Percentage Error of 100% means that none of the sculling error is eliminated. The smaller the Percentage Error, the more the sculling error is eliminated. A Percentage Error of zero means that the sculling error is completely eliminated.

It is desirable to explain first, third and higher order sculling error corrections.

Figure 5A:
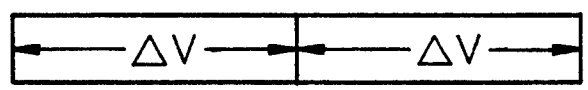
FIG. 5a is a timing diagram used to explain a first order incremental velocity transformation algorithm.
Figure 5A:
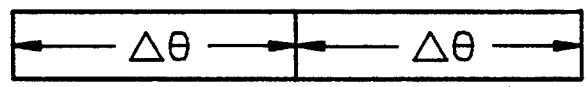

First order sculling correction, when the sampling rate for sculling error correction is the same as for coordinate transformation, according to the prior art, may be understood by referring to FIG. 5A. It is important in this discussion to understand that the accelerometer outputs represent incremental changes in velocity $\Delta V BODY$ over the accelerometer sampling period. This incremental velocity closely represents an average acceleration at the midpoint of the sampling interval. Similarly, the outputs of the angle sensors are measures of incremental changes, at the same sampling rate, in angle $\Delta \theta BODY$ over the angle sensor sampling period, and they closely represent average changes in angles at the midpoints of the sampling intervals. The $\Delta \theta BODY$ signals are converted in an attitude integration algorithm to determine the angular orientation of the body axes relative to the navigation axes. Observe that the accumulation $\phi$ of the $\Delta \theta BODY$s represents an angle at the end of the angle sensor accumulated sampling periods.

To accurately transform average accelerations from body axes to navigation axes, a time skew is built into the accelerometer versus angle sensor data sampling intervals as shown in FIG. 5A. This time skew ensures that the angle information is valid at the same time as the average acceleration data. The incremental velocity transformation first order sculling errors are reduced.

When using a first order sculling error reducing algorithm for reducing sculling errors in the velocity transformation, significant higher order sculling errors may persist. Because data is sampled at a finite rate, oscillatory motions of higher frequency signals are aliased and errors in the transformed navigation coordinate component signals are produced. Further, even for a signal whose frequency is below the sampling frequency, an approximation is made in considering the incremental velocity $\Delta V BODY$ signal to represent acceleration. $\Delta V$ truly is analogous to average acceleration, but the approximation degrades the calculated signal as the oscillation (vibratory) frequency approaches the sampling frequency. The sculling error frequency response for the first order sculling correcting algorithm discussed above is illustrated in FIG. 3, curve 50, for a typical sculling error and transformation iteration rate of 256 Hz.

The problems associated with the first order sculling error correcting algorithm can be addressed in two different ways, and the solutions may be combined. It is known that the attitude integration 19 and coordinate transformation 26 algorithms are truly the ones which burden the computer. Therefore, raising their iteration rate is impractical. It is possible to sample the angle sensors and accelerometers at a faster rate, according to the prior art, form a simple first order sculling correction, then accumulate the higher rate converted data to a lower iteration rate at which the attitude integration and velocity coordinate transformation occurs. A cross product between the sculling-error-corrected velocity signals and the body angle signals, at the same sampling rate bridges the gap between the higher instrument data sampling rate and the lower iteration rate of the attitude integration and coordinate transformation.

The lower iteration rate of the attitude integration and coordinate transformation is obtained either by using a slower sampling rate for the attitude integration 19 or accumulating the sampled angle signals in an accumulator (not shown) to the lower iteration rate before delivering the sampled signals to the apparatus 19.

The correction itself, with the different sampling frequencies, makes use of the fact that the sculling error is directly related to the vector cross-product $$\underline{a} \times \underline{\theta}.$$

A compensation term of the form below is computed $$\underline{\Delta V} \times \underline{\phi}$$

where $\underline{\phi}$ is the accumulation of the incremental angles (thus approximating $\underline{\theta}$). The number of terms accumulated is equal to the ratio of the data sampling rate to the coordinate conversion sampling rate. At each iteration within the coordinate conversion cycle, the variable $\phi$ accumulates an additional $\Delta \theta$. For example, for a sampling to conversion rate ratio of four, the following accumulations occur:

$$\phi_n = \Delta \theta_{(n-\frac{1}{2})}$$

$$\phi_{(n+1)} = \Delta \theta_{(n-\frac{1}{2})} + \Delta \theta_{(n+\frac{1}{2})}$$

$$\phi_{(n+2)} = \Delta \theta_{(n-\frac{1}{2})} + \Delta \theta_{(n+\frac{1}{2})} + \Delta \theta_{(n+3/2)}$$

$$\phi_{(n+3)} = \Delta \theta_{(n-\frac{1}{2})} + \Delta \theta_{(n+\frac{1}{2})} + \Delta \theta_{(n+3/2)} + \Delta \theta_{(n+5/2)}$$

For a sampling to conversion rate ratio of two, only the first two accumulations would be performed.

The compensation term corrects for sculling errors. When, for example, a first order 512 Hz sculling error correcting algorithm is used to supplement a 256 Hz attitude integration and coordinate transformation algorithm, the bandwidth is extended by a factor of two, and residual sculling errors are reduced in the frequency range below 512 Hz.

In the new art contemplated by this invention, a means and method is described to reduce the sculling errors by forming a third order or higher order sculling error correcting algorithm in apparatus 25 which improves the approximations of acceleration using incremental velocity ($\Delta V$) signals.

The third order correction of this invention, reduces the sculling errors as shown by curves 54 and 56 of FIG. 3. Curve 54 is for a sampling frequency of 256 Hz., and curve 56 is for a sampling frequency of 512 Hz with an iteration frequency of 256 for the iteration frequency of coordinate transformation apparatus 26.

Figure 5B:
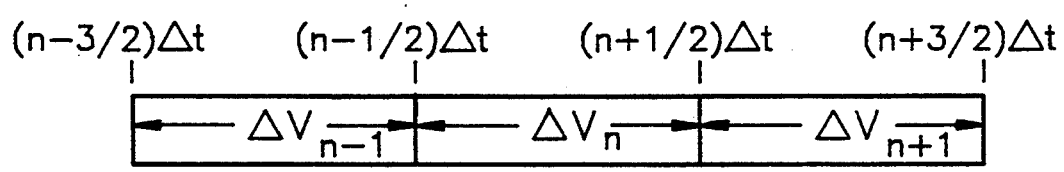
FIG. 5b is a timing diagram used to explain a third order incremental velocity transformation algorithm.
Figure 5B:
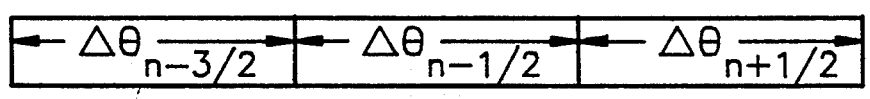

For the third order correction, the samples of incremental velocity signals and the samples of incremental angle signals are again staggered as shown in FIG. 5b. The samples are accumulated in apparatus 25 and used in a new algorithm which differs substantially from the algorithm used in the first order correction.

At any given sampling interval, the velocity change is "$\Delta V_n$"; the velocity change during the next preceding sampling interval is designated, "$\Delta V_{n-1}$"; and the velocity change during the next succeeding sampling interval is designated, "$\Delta V_{n+1}$." Similarly, the angle changes are designated, for any given sampling interval, "$\Delta \theta_{n-\frac{1}{2}}$"; "$\Delta \theta_{n-3/2}$"; and "$\Delta \theta_{n+\frac{1}{2}}$."

In the following equations, the time corresponding to "n" (See FIG. 5), occurs at the middle of the sampling segment "n." (i.e. the best approximation of the data's effective time) Thus, the beginning of the segment, "n" is at time corresponding to "n−(½)," and the end of the segment is at time corresponding to "n+(½)."

The equation for compensated incremental velocity for each of the vehicle body axes is calculated at time corresponding to "n−(½)," and it equals $$\Delta V_{nc} = \Delta V_n - (1/24)(\Delta V_{n+1} - 2\Delta V_n + \Delta V_{n-1})$$

When the sampling rate for the accelerometers 20, 22, 24 is the same as the iteration rate of the coordinate transformation apparatus 26, the corrected incremental velocity in the XNAV, YNAV ZNAV navigation coordinate system is the above value transformed through the computed attitude direction cosine matrix derived through the apparatus 19 from the angle sensor data.

The third order algorithm executes at the same iteration rate as the attitude integration and coordinate transformation algorithms and produces a response curve 54 as illustrated in FIG. 3. It is noted that curve 54 has the same cutoff frequency of 256 Hz as for curve 50. However, for vibration frequencies below the sampling frequency, the third order algorithm yields far smaller errors, shown in curve 54, than the errors, shown at 50, for the first order algorithm.

If it is desired further to extend the maximum bandwidth of the third order algorithm, angle sensor and accelerometer data may be sampled at a higher iteration rate and the third order incremental velocity sculling error correction discussed above may be applied to form a corrected high speed factor $$\underline{\Delta V_{nc}} = \underline{\Delta V_n} - 1/24(\underline{\Delta V_{n+1}} - 2\underline{\Delta V_n} + \underline{\Delta V_{n-1}}).$$

The compensated incremental velocity signals are then formed into a cross product signal-in apparatus 23 with the combined body angle signals $\phi$ from combiner 21. The cross product signals from apparatus 23 are accumulated in accumulator 15 to the lower rate at which the attitude integration and coordinate transformation takes place. The compensated incremental velocity signals are also accumulated in accumulator 17 to the lower rate at which the attitude integration and coordinate transformation takes place. The output signals of the accumulator 15 are subtracted from the output signals of the accumulator 17, and the signals produced in summers 28A, 28B, 28C are transformed in the coordinate transformation apparatus 26 into the navigation coordinate system.

Thus, to extend the sculling cutoff frequency using the high rate data, a correction is applied to the third order corrected high speed incremental velocities, $\Delta V_{nc}$, using the accumulated angle, $\phi$. This correction, as in prior art algorithms, is of the form $$\underline{\Delta V_{nc}} \times \underline{\phi}.$$

The correction is then accumulated to the lower iteration rate where attitude integrations and coordinate transformations are executed.

At the lower rate, the accumulated cross product signal from the apparatus 15 is subtracted in summing apparatus 28A, 270, 28C, from the accumulated incremental velocity from apparatus 17, and the resultant signal is rotated, in coordinate transformation apparatus 26, through the direction cosine matrix which relates the body coordinate frame and the navigation coordinate frame.

In such a way, a combination of the third order correction and the prior art first order sculling algorithm can be used to extend the cutoff frequency as well as reduce the sculling error at frequencies below the sampling frequency. Curve 56 of FIG. 3 illustrates an error curve using a 512 Hz third order sculling error correcting algorithm in apparatus 25 with an iteration rate of 256 in coordinate transformation apparatus 26.

The advantage of the third order mechanization disclosed herein becomes apparent when curves 50, 52 (first order) are compared with curves 54 and 56 (third order). For navigation systems which must operate in vibration environments, this sculling error reduction is an important feature. For example, at 50 Hz, which is often where sensors will see maximum vibration, from FIG. 3 a 256 Hz third order algorithm has only 1% residual error. The standard first order sculling correction mechanization has 6% residual error. A 512 Hz first order algorithm will have nearly 2% residual error. If a 512 Hz third order algorithm is used, the error is further reduced to 0.07%.

For an even sharper roll-off of the percentage error curves, higher order compensation could be used. For example, a fifth order compensation algorithm would use five consecutive sampling intervals, instead of three, for the calculation of $\Delta V_{nc}$ and $\phi$. An analysis follows showing the correction factors for any higher order sculling error compensation.

The sampling of the $\Delta V$ data inherently presents a bandwidth limitation and hence a loss of response to acceleration at high frequency. Terms which represent higher derivatives of velocity are formed and used to improve the response of the $\Delta V$'s.

Mathematically:

Given an acceleration $a(t) = a_0 \sin \omega t$, $$\Delta V(n\Delta t) = -(a_0/\omega)(\cos(n+\tfrac{1}{2})\omega\Delta t - \cos(n-\tfrac{1}{2})\omega\Delta t)$$

$$\Delta V(n\Delta t) = a_0 \Delta t (\sin(\tfrac{1}{2})\omega\Delta t / (\tfrac{1}{2})\omega\Delta t) \sin(n\omega\Delta t)$$

where $\Delta t$ is the sampling interval. At low frequencies (i.e. where $\omega\Delta t << 2\pi$), $$\sin((\tfrac{1}{2})\omega\Delta t)/(\tfrac{1}{2})\omega\Delta t \approx 1$$

so that $\Delta V(n\Delta t) \approx a(n\Delta t)\Delta t$

At higher frequencies, however, $\sin((\tfrac{1}{2})\omega\Delta t)/(\tfrac{1}{2})\omega\Delta t$ deviates substantially from 1. This is the fundamental source of loss of sculling response. To compensate for the loss, combinations of $\Delta V$'S are used to improve the response. To see the improvement, first consider the Taylor expansion of $$\sin((\tfrac{1}{2})\omega\Delta t)/(\tfrac{1}{2})\omega\Delta t \approx 1 - (1/6)((\tfrac{1}{2})\omega\Delta t)^2 + (1/120)((\tfrac{1}{2})\omega\Delta t)^4 - (1/5040)((\tfrac{1}{2})\omega\Delta t)^6 + \ldots$$

Further expanding:

$$\sin((\tfrac{1}{2})\omega\Delta t)/(\tfrac{1}{2})\omega\Delta t \approx 1 - (1/24)(\omega\Delta t)^2 + (1/1920)(\omega\Delta t)^4 - (1/322560)(\omega\Delta t)^6 + \ldots$$

A term with the same sinusoidal behavior as $\Delta V(n\Delta t)$ but which can cancel the second order term $(1/24)(\omega\Delta t)^2$ should be generated. A preferred way to generate such a term uses a second derivative term.

$$C_1(n\Delta t) = \Delta V((n+1)\Delta t) - 2\Delta V(n\Delta t) + \Delta V((n-1)\Delta t)$$
$$= a_0\Delta t \, (\sin((1/2)\omega\Delta t)/(1/2)\omega\Delta t) \, (\sin(n+1)\omega\Delta t - \sin n\omega\Delta t - (\sin n\omega\Delta t - \sin (n-1)\omega\Delta t))$$
$$= 2a_0\Delta t \, (\sin^2((1/2)\omega\Delta t)/(1/2)\omega\Delta t) \, (\cos(n+1/2)\omega\Delta t - \cos (n-1/2)\omega\Delta t)$$
$$= -4a_0\Delta t \, (\sin^3((1/2)\omega\Delta t)/(1/2)\omega\Delta t)(\sin n\omega\Delta t)$$

Expanding $$(\sin^3((1/2)\omega\Delta t)/(1/2)\omega\Delta t \approx ((1/2)\omega\Delta t - (1/6)((1/2)\omega\Delta t)^3 + \ldots)^2(1 - (1/6)((1/2)\omega\Delta t)^2 + \ldots)$$
$$\approx (((1/2)\omega\Delta t)^2 - (1/3)((1/2)\omega\Delta t)^4 + \ldots)(1 - (1/6)((1/2)\omega\Delta t)^2 + \ldots)$$
$$\approx ((1/2)\omega\Delta t)^2 - (1/3)((1/2)\omega\Delta t)^4 - (1/6)((1/2)\omega\Delta t)^4$$
$$\approx ((1/2)\omega\Delta t)^2 - (1/2)((1/2)\omega\Delta t)^4$$

Thus, $$-4a_0\Delta t \sin^3((\tfrac{1}{2})\omega\Delta t)/(\tfrac{1}{2})\omega\Delta t \approx -a_0\Delta t[(\omega\Delta t)^2 - (\tfrac{1}{8})(\omega\Delta t)^4 + \ldots]$$

By subtracting $(1/24)C_1(n\Delta t)$ from $\Delta V(n\Delta t)$, the second order term is cancelled, leaving a fourth order (and higher) error.

$$\Delta V(n\Delta t) - (1/24)C_1(n\Delta t) \approx a_0\Delta t[1 - (1/24)(\omega\Delta t)^2 + (1/1920)(\omega\Delta t)^4 - \ldots]\sin n\omega\Delta t + (1/24)a_0\Delta t[(\omega\Delta t)^2 - (1/8)(\omega\Delta t)^4 + \ldots]\sin n\omega\Delta t$$
$$\approx a_0\Delta t[1 - (3/640)(\omega\Delta t)^4 + \ldots]\sin n\omega\Delta t$$

The technique may be extended to cancel higher order terms. For example, by creating the derivative term $$C_2(n\Delta t) = C_1((n+1)\Delta t) - 2C_1(n\Delta t) + C_1((n-1)\Delta t)$$

the term $(3/640)(\omega\Delta t)^4$ may be cancelled, leaving only 6th order and higher order terms. The coefficient to be applied to $C_2(n\Delta t)$ is that which ensures total cancellation of the $(\omega\Delta t)^4$ term. It may be obtained by extending the expansions given above.

In the same fashion still higher order terms may be cancelled. The marginal benefits of extending the process decrease rapidly however, because other system errors (such as quantization errors) may make the algorithm noisy. While the high order sculling algorithm may be created in various ways, the preferred mechanization is:

$$\Delta V_c(n\Delta t) = \Delta V(n\Delta t) - K_1C_1(n\Delta t) - K_2C_2(n\Delta t) - \ldots,$$

and the higher order compensated incremental velocity term becomes, in general, for order $2j+1$:

$$\Delta V_{nc} = \Delta V_n - K_1C_1(n) - K_2C_2(n) - \ldots K_jC_j(n) - \ldots$$

where "j" is a running variable which increases with the order of the correction.
where $$C_1(n\Delta t) = \Delta V((n+1)\Delta t) - 2\Delta V(n\Delta t) + \Delta V((n-1)\Delta t)$$

and $$C_2(n\Delta t) = C_1((n+1)\Delta t) - 2C_1(n\Delta t) + C_1((n-1)\Delta t)$$

etc. . . . , and $$C_1(n) = \Delta V_{(n+1)} - 2\Delta V_n + \Delta V_{(n-1)}$$

$$C_2(n) = C_1(n+1) - 2C_1(n) + C_1(n-1)$$

$$C_j(n) = C_{(j-1)}(n+1) - 2C_{(j-1)}(n) + C_{(j-1)}(n-1),$$

and where the coefficients $K_1, K_2, \ldots$ are determined to eliminate successively higher order terms. That is, $K_1$ cancels second order terms in $\Delta V$, $K_2$ cancels fourth order terms in $\Delta V - K_1C_1$, $K_3$ cancels sixth order terms in $\Delta V - K_1C_1 - \ldots - K_2C_2$.

In general, $K_j$ cancels $2j$ order terms in $\Delta V - K_1C_1 - \ldots K_{(j-1)}C_{(j-1)}$.

There has thus been described a mechanism and process for reducing sculling errors in a coordinate transformation system from a strapped down system of coordinates to a calculated navigation system of coordinates, and more particularly for reducing such sculling errors in accelerometer signals.

It is not intended that the invention shall be limited to the above description, but only in accordance with the accompanying claims.

We claim:

1. Apparatus for converting signals from vehicle-referenced coordinates into stabilized navigation coordinates, comprising:
   angle measuring means for producing first angle signals, sampled at a first sampling frequency, in a first set of movable coordinates;
   attitude integration means, connected to receive said first sampled angle signals and to transform them into second sampled angle signals in a second set of stabilized navigation coordinates;
   accelerometer means for producing first acceleration signals, sampled at said first frequency, that are measures of changes in velocity in said first set of coordinates;
   sculling correction means of order higher than the first, receiving said first acceleration signals and creating incremental velocity correction signals;
   means for subtracting said incremental velocity correction signals from said first acceleration signals to produce first compensated incremental velocity signals that are measures of changes in velocity, corrected for sculling errors, in said first set of coordinates; and
   coordinate transformation means, connected to receive said second sampled angle signals and said compensated incremental velocity signals for transforming said compensated incremental velocity signals into second incremental velocity signals that are measures of changes in velocity, corrected for sculling errors, in said second set of coordinates.

2. Apparatus as recited in claim 1 in which said sculling correction means is of the third order, and in which the third order compensated incremental velocity signals are $$\Delta V_{nc} = \Delta V_n - (1/24)(\Delta V_{n+1} - 2\Delta V_n + \Delta V_{n-1})$$

3. Apparatus as recited in claim 1 in which said sculling correction means is of the $(2j+1)$th order, and in which the $(2j+1)$th order compensated incremental velocity signals are $$\Delta V_{nc} = \Delta V_n - K_1C_1(n) - K_2C_2(n) \ldots - K_jC_j(n) - \ldots$$

where $$C_1(n) = \Delta V_{(n+1)} - 2\Delta V_n + \Delta V_{(n-1)},$$

$$C_2(n) = C_1(n+1) - 2C_1(n) + C_1(n-1),$$

and $$C_j(n) = C_{(j-1)}(n+1) - 2C_{(j-1)}(n) + C_{(j-1)}(n-1),$$

and where K is chosen to cancel the 2j term of $\Delta V_{nc}$.

4. Apparatus for converting signals from vehicle-referenced coordinates into stabilized navigation coordinates, comprising:

angle measuring means for producing first angle signals, sampled at a first sampling frequency, in a first set of movable coordinates;

attitude integration means, connected to receive said first sampled angle signals and to transform them, at a second lower frequency, into second sampled angle signals in a second set of stabilized navigation coordinates;

accelerometer means for producing first acceleration signals, sampled at said first frequency, that are measures of changes in velocity in said first set of coordinates;

sculling correction means of order higher than the first, receiving said first acceleration signals and creating first incremental velocity correction signals;

means for subtracting said first incremental velocity signals from said first acceleration signals to produce first compensated incremental velocity signals that are measures of changes in velocity in said first set of coordinates;

combiner means for combining a number of consecutive samples of said sampled angle signals to produce a modified angle change signal, said number being equal to the ratio of said first sampling frequency to said second sampling frequency;

sculling cross product apparatus, connected to create cross product signals which are the cross product of said first compensated incremental velocity signals and said modified angle change signal;

first and second accumulator means to accumulate, respectively, said cross product signals and said first compensated incremental velocity signals to said lower second frequency;

means for subtracting said accumulated cross product signals from said first accumulated compensated incremental velocity signals to produce second compensated incremental velocity signals; and coordinate transformation means, connected to receive said second sampled angle signals and said second compensated incremental velocity signals for transforming said second compensated incremental velocity signals into third compensated incremental velocity signals that are measures of changes in velocity, corrected for sculling errors, in said second set of coordinates.

5. Apparatus as recited in claim 4 in which said sculling correction means is of the third order, and in which the compensated incremental velocity signals are $$\Delta V_{nc} = \Delta V_n - (1/24)(\Delta V_{n+1} - 2\Delta V_n + \Delta V_{n-1}),$$

and in which said combiner means combines consecutive sampled signals from said angle sensor means, the number of said combined signals being equal to the ratio of the sculling correction sampling frequency to the coordinate transformation frequency.

6. Apparatus as recited in claim 4 in which said sculling correction means is of the (2j+1)th order, and in which the (2j+1)th order compensated incremental velocity signals are $$\Delta V_{nc} = \Delta V_n - K_1 C_1(n) - K_2 C_2(n) \ldots - K_j C_j(n) - \ldots$$

where $$C_1(n) = \Delta V_{(n+1)} - 2\Delta V_n + \Delta V_{(n-1)},$$

$$C_2(n) = C_1(n+1) - 2C_1(n) + C_1(n-1),$$

and $$C_j(n) = C_{(j-1)}(n+1) - 2C_{(j-1)}(n) + C_{(j-1)}(n-1),$$

and where K is chosen to cancel the 2j term of $\Delta V_{nc}$.

* * * * *